United States Patent
Schindler

(10) Patent No.: US 9,744,825 B2
(45) Date of Patent: Aug. 29, 2017

(54) METHOD FOR CONTROLLING A SUSPENSION SYSTEM

(71) Applicant: AUDI AG, Ingolstadt (DE)

(72) Inventor: Andreas Schindler, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/304,619

(22) PCT Filed: Mar. 24, 2015

(86) PCT No.: PCT/EP2015/000628
§ 371 (c)(1),
(2) Date: Oct. 17, 2016

(87) PCT Pub. No.: WO2015/158412
PCT Pub. Date: Oct. 22, 2015

(65) Prior Publication Data
US 2017/0036504 A1    Feb. 9, 2017

(30) Foreign Application Priority Data
Apr. 15, 2014    (DE) .................. 10 2014 005 594

(51) Int. Cl.
*B60G 17/015*    (2006.01)
*B60G 13/14*    (2006.01)
(Continued)

(52) U.S. Cl.
CPC .......... *B60G 17/0157* (2013.01); *B60G 13/14* (2013.01); *B60G 15/06* (2013.01);
(Continued)

(58) Field of Classification Search
None
See application file for complete search history.

(56) References Cited

U.S. PATENT DOCUMENTS 2,949,315 A * 8/1960 Taylor .................. B60G 15/12
 180/41
4,762,194 A    8/1988 Morishita
(Continued)

FOREIGN PATENT DOCUMENTS

DE        101 20 102 A1    10/2002
DE    10 2007 060 876 A1    7/2008
(Continued)

OTHER PUBLICATIONS

English copy of International Search Report issued by the European Patent Office in International Application PCT/EP2015/000628.

*Primary Examiner* — Shelley Chen
(74) *Attorney, Agent, or Firm* — Henry M. Feiereisen LLC

(57) ABSTRACT

A method for controlling an active suspension system which includes at least on spring and at least one damper as actuators and electromechanical controllers which are assigned to the actuators and can be either operated as a generator or as a motor. The method includes subtracting a value for an amount of electrical energy converted by the suspension system in a driving maneuver from an actual value of electrical energy stored in the electrical energy storage, thereby forming a differential value; comparing the differential value with at least one threshold value; when the differential value is greater than a maximal threshold value and at least a first one of electromechanical controllers is operated as a generator, operating at least one second one of the electromechanical controllers as a motor, wherein at least a portion of electrical energy which is generated by the at least one first electromechanical controller is simultaneously converted by the at least one second electromechanical controller into mechanical energy.

10 Claims, 9 Drawing Sheets

(51) Int. Cl.
*B60G 17/0165* (2006.01)
*B60G 17/02* (2006.01)
*B60G 17/06* (2006.01)
*B60G 15/06* (2006.01)
*B60G 17/08* (2006.01)

(52) U.S. Cl.
CPC ....... *B60G 17/0165* (2013.01); *B60G 17/021* (2013.01); *B60G 17/06* (2013.01); *B60G 17/08* (2013.01); *B60G 2202/42* (2013.01); *B60G 2300/60* (2013.01); *B60G 2400/90* (2013.01); *B60G 2500/10* (2013.01); *B60G 2500/20* (2013.01); *B60G 2600/02* (2013.01)

(56) References Cited

U.S. PATENT DOCUMENTS

| | | |
|---|---|---|
| 5,091,679 A | 2/1992 | Murty |
| 9,108,482 B2 | 8/2015 | Mohrlock et al. |
| 9,205,874 B2 | 12/2015 | Mohrlock et al. |
| 9,321,323 B2 | 4/2016 | Schindler et al. |
| 9,434,230 B2 | 9/2016 | Schindler et al. |
| 2007/0194733 A1 | 8/2007 | Kurokochi |
| 2010/0262308 A1 | 10/2010 | Anderson |
| 2011/0120114 A1* | 5/2011 | Alexander ................ F02G 5/04 60/527 |
| 2011/0298399 A1 | 12/2011 | Ogawa |
| 2013/0099455 A1 | 4/2013 | Schindler et al. |
| 2015/0191071 A1 | 7/2015 | Schindler et al. |
| 2015/0224845 A1* | 8/2015 | Anderson ............ B60G 17/019 701/37 |

FOREIGN PATENT DOCUMENTS

| | | |
|---|---|---|
| DE | 102009035596 A1 | 2/2010 |
| EP | 1997 655 B1 | 5/2013 |

\* cited by examiner

METHOD FOR CONTROLLING A SUSPENSION SYSTEM

CROSS-REFERENCES TO RELATED APPLICATIONS

This application is the U.S. National Stage of International Application No. PCT/EP2015/000628, filed Mar. 24, 2015, which designated the United States and has been published as International Publication No. WO 2015/158412 and which claims the priority of German Patent Application, Serial No. 10 2014 005 594.9, filed Apr. 15, 2014, pursuant to 35 U.S.C. 119(a)-(d).

BACKGROUND OF THE INVENTION

The invention relates to a method and a system for controlling an active suspension system of a motor vehicle.

An active suspension system of a motor vehicle includes multiple electromechanical controllers and is also referred to as electronic active body control (eABC) and thus as electronic active suspension control system. Hereby eat of the usually four actuators of the active suspension system a respective powerful electric machine is assigned, which is why the active suspension system in certain operating situations as a power requirement of several kilowatts, wherein an electrical energy to be provided is for example obtained from a medium voltage onboard network with a network voltage of 48 V, which has multiple users. However it is also possible that electrical energy is fed back into the medium voltage onboard network from the suspension system. The medium voltage onboard network includes a storage element, which can for example be constructed as a battery, for example if 48 V lithium ion battery, or a capacitor which is also referred to as "super caps".

A suspension arrangement for a motor vehicle is known from the patent document DE 10 2007 060 876 A1. Hereby a damping element, which includes an electromechanical converter, is arranged between a sprung mass and an unsprung mass. In an active state of the electromechanical converter the damping element is motorically operated by the electromechanical converter, wherein in a passive state of the electromechanical converter motion energy of the damping element can be converted into electrical energy by the electromechanical converter. The active or the passing state can be selectively set.

In the patent document EP 1 997 655 B1 a suspension system for a vehicle is described in which a control of actuators depends on a state of charge of a battery. During operation of the suspension system electrical energy can be transmitted to the actuators from the battery for actuating the actuators.

SUMMARY OF THE INVENTION

In light of the foregoing a method and a system with the features of the independent patent claims are disclosed. Embodiments of the provided method and system are set forth in the dependent patent claims and the description.

The method is provided for controlling an active suspension system of a motor vehicle. The active suspension system has as actuators at least one spring and at least one damper, wherein each actuator an electromechanical controller is assigned, which interacts with this actuator. In addition each electromechanical controller is connected with at least one electrical energy storage of the motor vehicle via an onboard network of the motor vehicle. At least one electromechanical controller can be operated either as a generator or as a motor. When the at least one electromechanical controller is operated as a generator, conversion of electrical energy during a driving maneuver produces electrical energy, whose amount has a negative value. When the at least one electromechanical controller is operated as a motor, conversion of electrical energy during a driving maneuver consumes electrical energy, whose amount has a positive value. In the method a value for an amount of electrical energy converted by the suspension system, and with this by the at least one electromechanical controller, during an actual driving maneuver is subtracted from an actual value for the amount of electrical energy stored in the at least one electrical energy storage, and thereby a value for a difference of electrical energy is determined. This difference is compared with at least one threshold value, wherein when the difference of electrical energy is greater than a maximal threshold value and at least one first electromechanically controller is operated as a generator, at least one second electromechanical controller is operated as a motor, wherein at least a part of the electrical energy generated by the at least one first electromechanical controller is simultaneously converted by the at least one second electromechanically controller into mechanical energy.

When the at least one electromechanical controller is operated as a generator the value of the electrical energy generated thereby is negative and the resulting difference is greater than the actual value of the electrical energy that is stored in the at least one energy storage. When the at least one electromechanical controller is operated as a motor the value of the energy consumed hereby is positive so that the difference is smaller than the actual value of the energy stored in the at least one energy storage.

In addition at least one additional electromechanical machine, which is connected with the at least one electrical energy storage, can be operated as a motor in order to additionally consume electrical energy during the driving maneuver.

In another embodiment, when the difference of electrical energy is smaller than a minimal threshold value and at least one first electromechanical controller is operated as motor, at least one second electromechanical controller is operated as generator, wherein at least a part of the electrical energy consumed by the at least one first electromechanical controller is simultaneously generated by the at least one second electromechanical controller. For this purpose additionally at least one additional electromechanical machine, which is connected with the electrical energy storage, can be operated as a motor.

Usually each electromechanical controller is operated as a generator in a first operating mode and as a motor in a second operating mode. Each of the electromechanical controllers that is operated as a generator in the first operating mode is mechanically impinged by the assigned actuator, wherein the electromechanical controller that is operated as a generator converts mechanical energy into electrical energy whose amount per definition has the negative value and which is stored in the at least one electrical energy storage. On the other hand each electromechanical controller that is operated as a motor in the second operating mode converts electrical energy from the at least one electrical energy storage into mechanical energy, whereby the actuator that is assigned to the electromechanical controller is mechanically impinged. The electrical energy consumed in this operating mode per definition has a positive value.

The controllers can be set via setting signals which are provided by at least one control device. This also means that an operating mode provided for an electromechanical controller is set via the settings signals. In addition the amount of generated electrical energy that has the negative value and an amount of electrical energy that has the positive value and is simultaneously converted into mechanical energy can be set via the setting signals.

Usually at least one wheel of the motor vehicle is connected with a chassis of the motor vehicle via at least one spring as actuator and by at least one damper as actuator of the active suspension system.

In an embodiment at least one first electromechanical controller, which is assigned to at least one first actuator of the at least one wheel of the motor vehicle, is operated as a generator, and at least one second electromechanical controller, which is assigned to a second actuator of the same wheel is simultaneously operated as a motor.

It is also possible that at least one first electromechanical controller that is assigned to at least one actuator that is constructed as a spring, is operated as a generator, and at least one further electromechanical controller, which is assigned to at least one actuator that is constructed as a damper, is simultaneously operated as a motor.

As an alternative or in addition at least one first electromechanical controller, that is assigned to at least one actuator that is configured as damper, is operated as a generator and at least one further electromechanical controller that is assigned to at least one actuator that is constructed as a spring, is simultaneously operated as a motor.

An amount of electrical energy which is generated by the at least one first electromechanical controller that is operated as a generator, and the amount of electrical energy which is simultaneously converted into mechanical energy by a second electromechanical controller which is operated as a motor, can be adjusted to each other.

In this regard an amount of electrical energy that is converted into mechanical energy by at least one electromechanical controller that is operated as a motor, can be adjusted to the amount of electrical energy that is simultaneously generated by at least one electromechanical controller that is operated as a generator. Hereby the amount of electrical energy that is converted into mechanical energy can be adjusted to be at least as great as the amount of the simultaneously generated electrical energy. As an alternative an amount of mechanical energy which is converted into electrical energy by at least one electromechanical controller that is operated as a generator, can be adjusted to the amount of electrical energy which is simultaneously consumed by the at least one electromechanical controller that is operated as a motor, wherein the amount of mechanical energy that is converted into electrical energy is adjusted to be at least as great as the simultaneously consumed amount of electrical energy.

In addition the amount of electrical energy that is converted into mechanical energy, as well as the simultaneously generated amount of electrical energy can be adjusted to each other in dependence on the amount of electrical energy that is stored in the at least one electrical energy storage and/or can be coupled with each other. This can mean, that an amount of electrical energy that is generated by the at least one first electromechanical controller that is operated as a generator, and an amount of electrical energy that is converted into mechanical energy by the at least one second electromechanical controller that is operated as a motor can be adjusted to each other, wherein a sum of the negative value of the amount of the generated electrical energy and the positive value of the amount of the consumed electrical energy can become zero.

In a further embodiment the amount of electrical energy that is converted into mechanical energy is adjusted to be at least as great as the simultaneously generated amount of electrical energy.

The maximum threshold value and/or the minimum threshold value can be determined in dependence on the number of the controllers that are operated as generators.

In addition further parameters for electrical energy, which are exchanged between the controllers and with the at least one electromechanical energy storage can be taken into account. A change of the converted electrical energy over time is referred to as power. The power depends on a flowing current and an applied voltage. The energy also depends on the time, for example a time interval for a duration of the performed driving maneuver, in which the electrical energy is converted.

In an embodiment of the method a value of a current, which is required during the driving maneuver by the suspension system for converting electrical energy, can be compared with a threshold value provided for this purpose, wherein when the value of the current is smaller than the threshold value and the at least one first electromechanical controller is operated as a generator, the at least one second electromechanical controller is operated as a motor.

The system according to the invention is configured for controlling an active suspension system of a motor vehicle. Hereby the active suspension system includes as actuators at least one spring and at least one damper, wherein each actuator is assigned an electromechanical controller, which interacts with this actuator, wherein each electromechanical controller is connected with at least one electrical energy storage of the motor vehicle by a onboard network of the motor vehicle. Hereby at least one electromechanical controller can be operated as a generator, wherein the at least one electromechanical controller can generate electrical energy converted during a driving maneuver, whose amount has a negative value. As an alternative the at least one electromechanical controller can be operated as a motor, wherein electrical energy converted during a driving maneuver can be consumed by the at least one electromechanical, with the amount of the consumed electrical energy having a positive value. The system has a control device, which is configured to subtract from an actual value for an amount of electrical energy that is stored in the at least one electrical energy storage a value for the amount of electrical energy that can be converted, i.e., generated or consumed by the suspension system during and actually performed driving maneuver, and to compare a value for a difference of electrical energy determined thereby with at least one threshold value. when the difference of electrical energy is greater than a maximum threshold value and at least one first electromechanical controller is operated as a generator, the control device is configured to operate at least one second electromechanical controller as a motor, wherein at least a part of the electrical energy that is generated by the at least one first electromechanical controller is simultaneously converted into mechanical energy by the a least one second electromechanical controller.

In a further embodiment, the control device is configured to operate at least one second electromechanical controller as a motor when the difference of electrical energy is smaller than a minimal threshold value and at least one first electromechanical controller is operated as a motor, wherein at least a part of the electrical energy that is consumed by the at least one first electromechanical controller is simultaneously generated by the at least one second electromechanical controller.

The method and system are provided for controlling the active electric suspension for influencing a power demand on the electrical onboard network of the motor vehicle.

In an implementation of the method electromechanical controllers are specifically controlled for impinging springs and dampers of the active electric suspension system, for example according to an algorithm, and are thus controlled by open loop and/or closed loop control, whereby a requirement of electrical energy of the active electrical suspension system can be varied in a controlled manner. Hereby defaults for control signals for controlling the electromechanical controllers are concretely influenced, whereby on one hand a predetermined defined amount of electrical energy is withdrawn from the onboard network, and on the other hand fed back into the onboard network in a targeted manner. Hereby a value of the electrical energy is varied in the at least one energy storage and thus is either increased or decreased.

Usually a spring, which is assigned to a wheel of the motor vehicle, is assigned at least one electromechanical controller, a so-called spring controller, which depending on the operating situation can be either operated as a motor or as a generator. In addition also a damper, which is assigned to the same wheel of the motor vehicle, can also be assigned at least one electromechanical controller, a so-called damper controller, which depending on the operating situation can also be either operated as a motor or as a generator.

When such an electromechanical controller is operated as a motor the electromechanical controller converts electrical energy, whose amount has the positive value, from the at least one electrical storage element of the "network into mechanical energy, whereby the spring or the damper, which is assigned to the electromechanical controller can be caused to undergo a movement. On the other hand when operating the electromechanical controller as a generator it is provided that this electromechanical controller converts mechanical energy into electrical energy when the spring or the damper that is assigned to the electromechanical controller undergoes a movement.

In an embodiment the at least one controller that is operated as a motor is hereby controlled with a higher dynamic for compensating electrical energy, which is simultaneously generated by the at least one controller that is operated as a generator, which allows discharging the at least one electrical storage element can of the onboard network in a targeted manner. Thus other users or consumers of the onboard network that are configured as electromechanical machine can feed electrical energy back into the storage element when operated as a generator. An additional excitation, usually of a superstructure of the motor vehicle, by the at least one controller that is operated as a motor, which results from the increased dynamic, can be damped again by a targeted hardening of the at least one active damper, for example adjustment damper, of the suspension system which cooperates or interacts with the at least one controller.

In a strategy for controlling the electromechanical active suspension system by open loop and/or closed loop control, asynchronous control signals are provided to a controller of the suspension system that is either operated as a motor or as a generator. Thus when a great amount of electrical energy is required, a current that can be provided to such an electromechanical controller from the at least one electrical energy storage is quickly ramped up, whereby the at least one electrical energy storage or a corresponding storage element is quickly discharged. On the other hand in order to enable a small recuperation power and/or feeding back of the electrical energy into the at least one electrical energy storage, the at least one electromechanical controller is slowly decelerated.

The method thus enables influencing a state of charge of the at least one electrical energy storage of the onboard network and with this the entire onboard network by the provided strategy for controlling the suspension system in a targeted manner, which allows increasing among other things an availability of safety-critical users of the onboard network. The state of charge is here defined by the value of the amount of electrical energy in at least one energy storage. Hereby the regulation is performed by means of an algorithm, by which the requirement of electrical energy of the suspension system is influenced. The regulation that can be performed with the algorithm includes the measure to control the electromechanical controllers of the suspension system that are assigned to the springs as well as the electromechanical controllers of the active dampers of the suspension system and/or chassis in the provided control of the suspension system via the control signals in a controlled manner, wherein the control of the actuators that are assigned to the Springs as well as a control of the controllers that are assigned to the springs as well as a control of the controllers that are assigned to the dampers can be coupled with each other in order to decrease electrical energy in an entire system.

The onboard network of the motor vehicle, which for example has an operating voltage of 48 volts, is used by multiple components or users and/or consumers at the same time, wherein electrical energy with the provided operating voltage is provided to the components for power retrieval, wherein over time a maximal current gradient is provided. In addition a component of the motor vehicle that is configured as an electromechanical controller and with this as an electric machine, can, when operated as a generator convert mechanical energy into electrical energy and can feed this energy back into the at least one electrical energy storage of the onboard network for the internal recuperation. On the other hand the same electric machine when operated as a motor can convert electrical energy from the at least one electrical energy storage into mechanical energy.

An embodiment of the described method achieves that the at least one electrical energy storage, usually at battery or an accumulator, has sufficient capacity for storing electrical energy and is therefore at any time only partially charged but never fully charged. Thus, it is possible that electromechanical controllers that are assigned to the springs of the active electronic suspension system, electromechanical controllers that are assigned to the dampers of the active electronic chassis and/or the suspension system, as well as other components of the onboard network, usually electromechanical machines, insofar as these generate electrical energy, can feed the electrical energy back into the at least one electrical energy storage and can thus recuperate the electrical energy. Accordingly all components can be fully operated wherein these components can also execute safety-critical functions.

Further embodiments and advantages of the invention will become apparent from the description and the included drawing.

It is understood that the features mentioned above and to be explained below may not only be used in the stated combination but also in other combinations or individually without departing from the present invention.

BRIEF DESCRIPTION OF THE DRAWING

The invention is schematically illustrated in the drawing by way of embodiments and is described schematically and in detail with reference to the drawings.

DETAILED DESCRIPTION OF PREFERRED EMBODIMENTS

Figure 1:
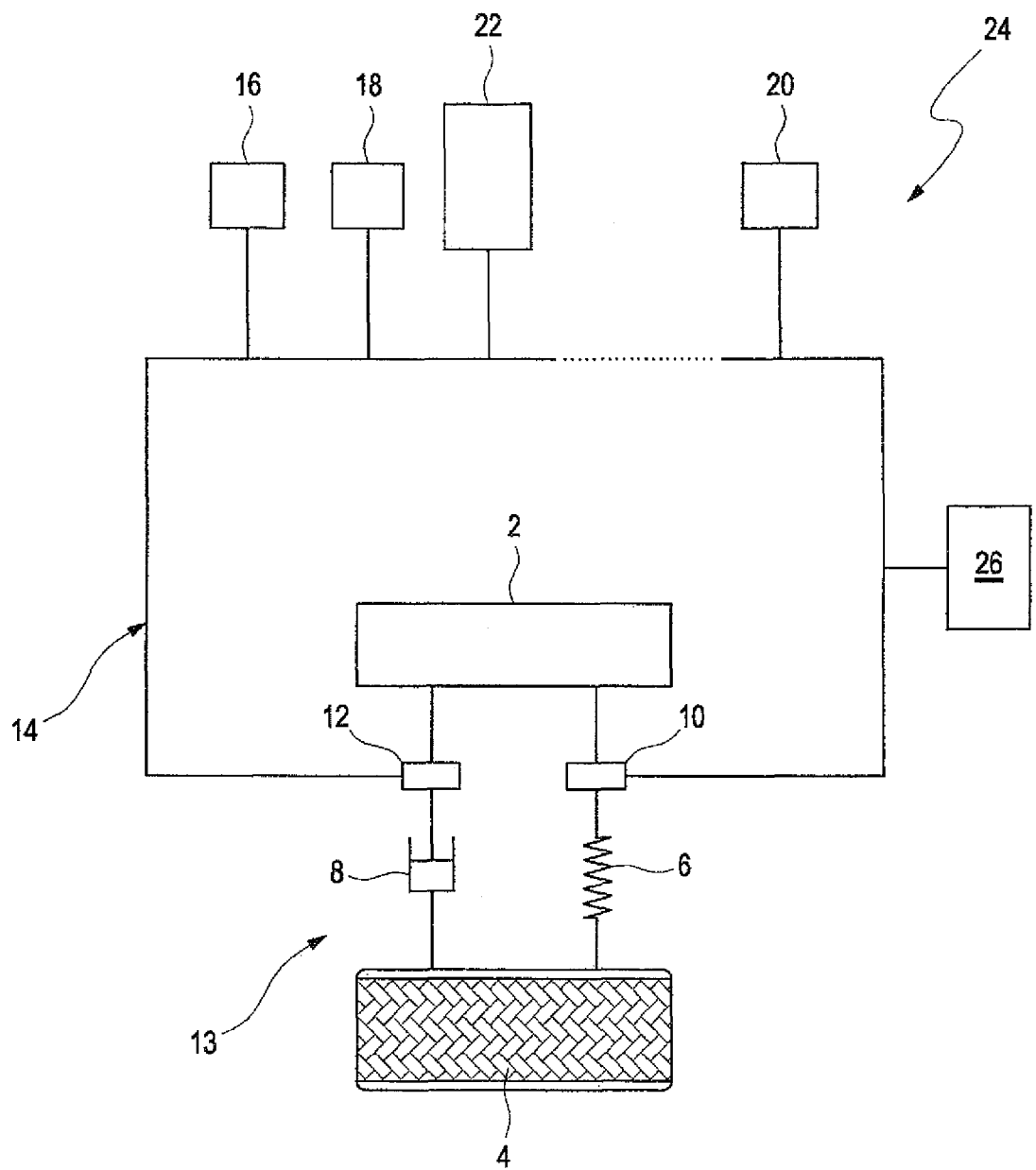
FIG. 1 shows a schematic representation of an embodiment of the system according to the invention and irrespective example for components often active electronic suspension system and an electronic onboard network off a motor vehicle during performance of an embodiment of the method according to the invention.

FIG. 1 shows as partial systems of the motor vehicle its chassis 2 and one of multiple wheels 4. Each wheel 4 is connected with the chassis 2 via a spring as a first actuator 6 and a damper as a second actuator 8. In addition a spring-specific electromechanical controller 10 or electromechanical spring controller 10 is assigned to the actuator 6 that is configured as a spring, which controller 10 is configured to interact with the spring, wherein this spring specific electromechanical spring controller 10, depending on the operating situation, is either operated as a motor or as a generator. The actuator 8, which is configured as damper is assigned a damper-specific electromechanical controller 12 or damper controller 12, which interacts with the damper and, depending on the operating situation is either operated as a motor or as a generator.

The actuators 6, 8 and also the controllers 10, 12 are configured as components of the active electronic suspension system 13 and/or, depending on the definition, as components of the chassis 2 of the motor vehicle. Because the motor vehicle has multiple wheels, further here not shown actuators 6, 8, i.e., springs and dampers, and also controllers 10, 12, i.e., spring—and damper—controllers 10, 12 are also configured as components of the active electronic suspension system 13 and/or the chassis 2. Hereby a respective further wheel is also connected with the chassis 2 of the motor vehicle via a spring as first actuator 6 and a damper as second actuator 8, to which a respective electromechanical controller 10, 12 is assigned.

In addition all electromechanical controllers 10, 12 are connected with an electric onboard network 14 or energy onboard network of the motor vehicle and depending on the definition are also configured as components of the electric onboard network 14. As further components connected with the actuators 10, 12 the onboard network 14 has multiple users 16, 18, 20 and at least one electrical energy storage 22. Q by at least one of these users 16, 18, 20 can be configured as the electromechanical machine.

Hereby it is provided that electrical energy is provided by an electrical energy storage 22 to the at least one electromechanical controller 10, 12 of the active suspension system 13, when this actuator is operated in an operating situation as a motor or motorically in order to mechanically impinge the at least one actuator 6, 8 that is assigned to it, i.e., the at least one spring and/or the at least one damper that are assigned to it, and thus to move it, which energy is converted into mechanical energy by the at least one controller 10, 12 for impinging the at least one actuator 6, 8 assigned to it. In this case the at least one controller 10, 12 acts as a user of electrical energy, wherein an amount of used electrical energy by definition has a positive value.

When on the other hand the at least one electromechanical controller 10, 12 is impinged by the at least one actuator 6, 8 that is assigned to it, i.e., by the at least one spring and/or by the at least one damper and his thus moved, the at least one controller 10, 12 is operated in operating situation as a generator or in a generator mode, wherein the at least one controller 10, 12 converts the mechanical energy generated by the spring and/or the damper into electrical energy. This generated electrical energy is provided to the at least one electrical energy storage 22 via the electric al onboard network 14 and is stored in the at least one electrical energy storage 22. In this operating situation at least one electromechanical controller 10, 12 acts as a producer of electrical energy, wherein an amount of produced electrical energy by definition has a negative value.

At least one of the users 16, 18, 20 can be configured or operated as a producer and/or as a consumer of electrical energy. When the at least one user 16, 18, 20 is only configured as a generator of electrical energy and is operated as such an amount of electrical energy with a negative value is provided to the at least one energy storage by this at least one user 16, 18, 20. When the at least one user 16, 18, 20 is only configured as a consumer of electrical energy and is operated as such an amount of electrical energy having a positive value can be provided to this at least one user 16, 18, 20 by the at least one energy storage. As an alternative or in addition it is also possible that the at least one user 16, 18, 20 similar to the at least one controller 10, 12, depending on the operating situation, is operated as a consumer of electrical energy for example as a motor, or as a producer of electrical energy for example as a generator.

Figure 2A:
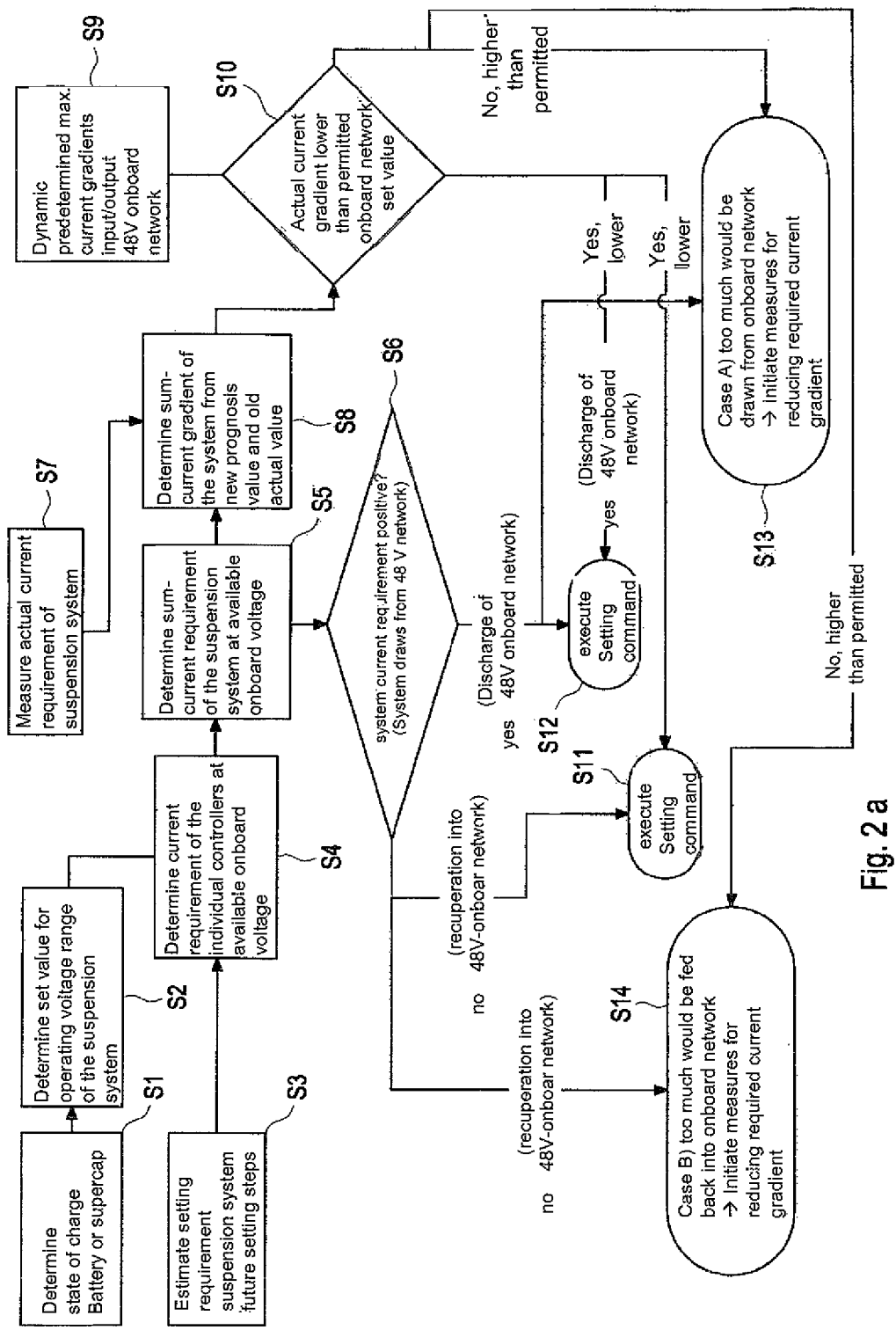
FIG. 2 shows different partial diagrams of a diagram for performing different variants of the embodiment of the method according to the invention.
Figure 2B:
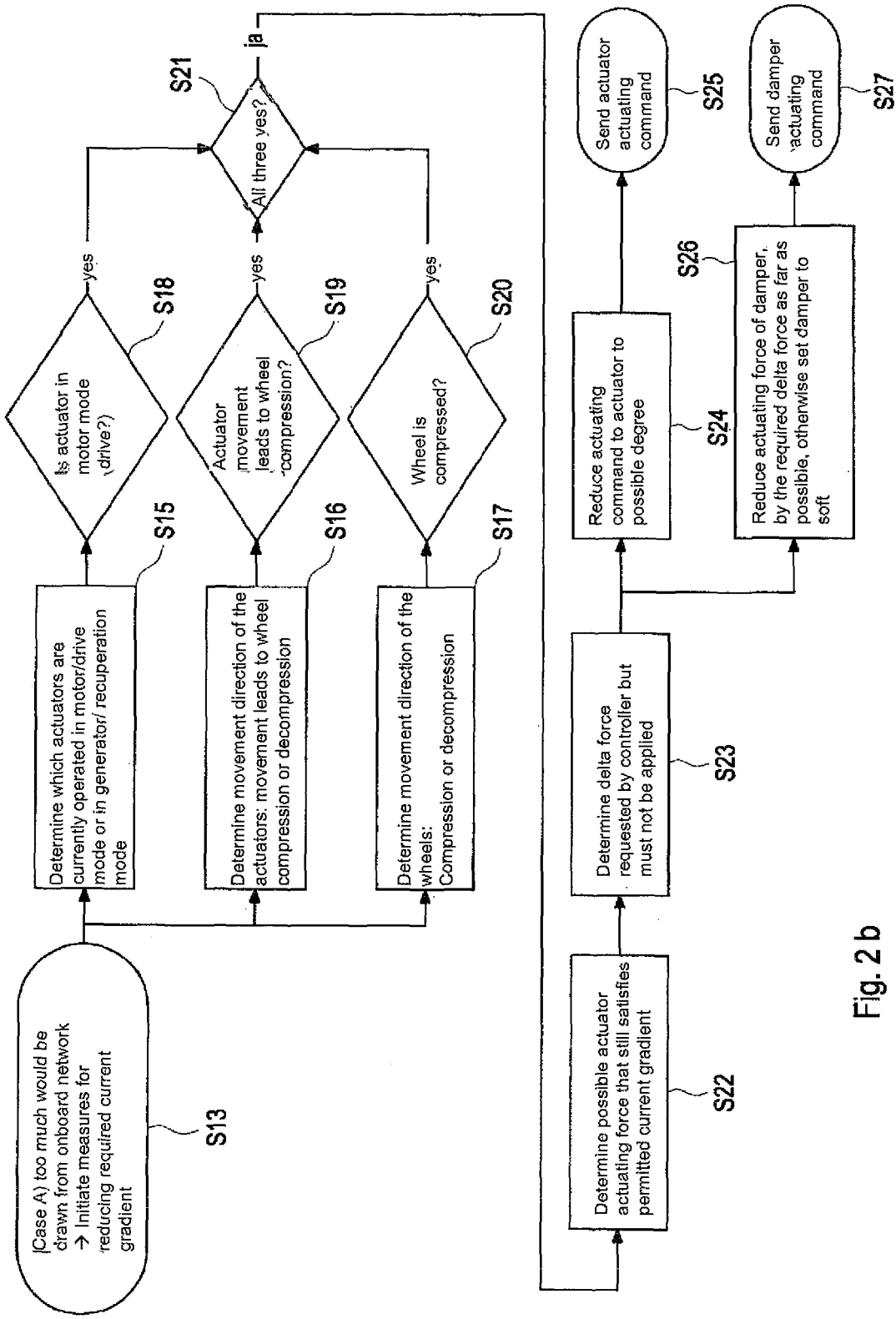
Figure 2:
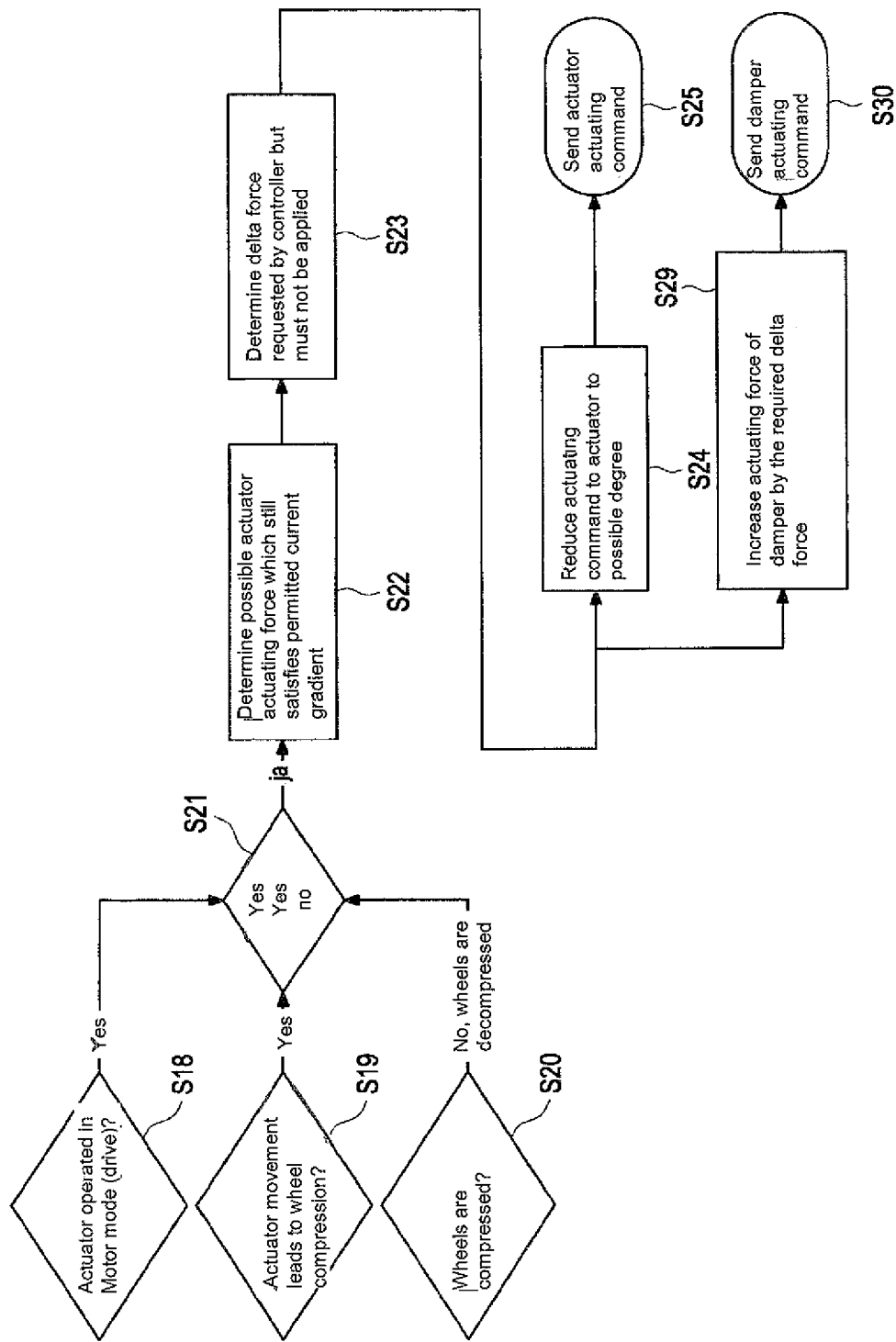
Figure 2:
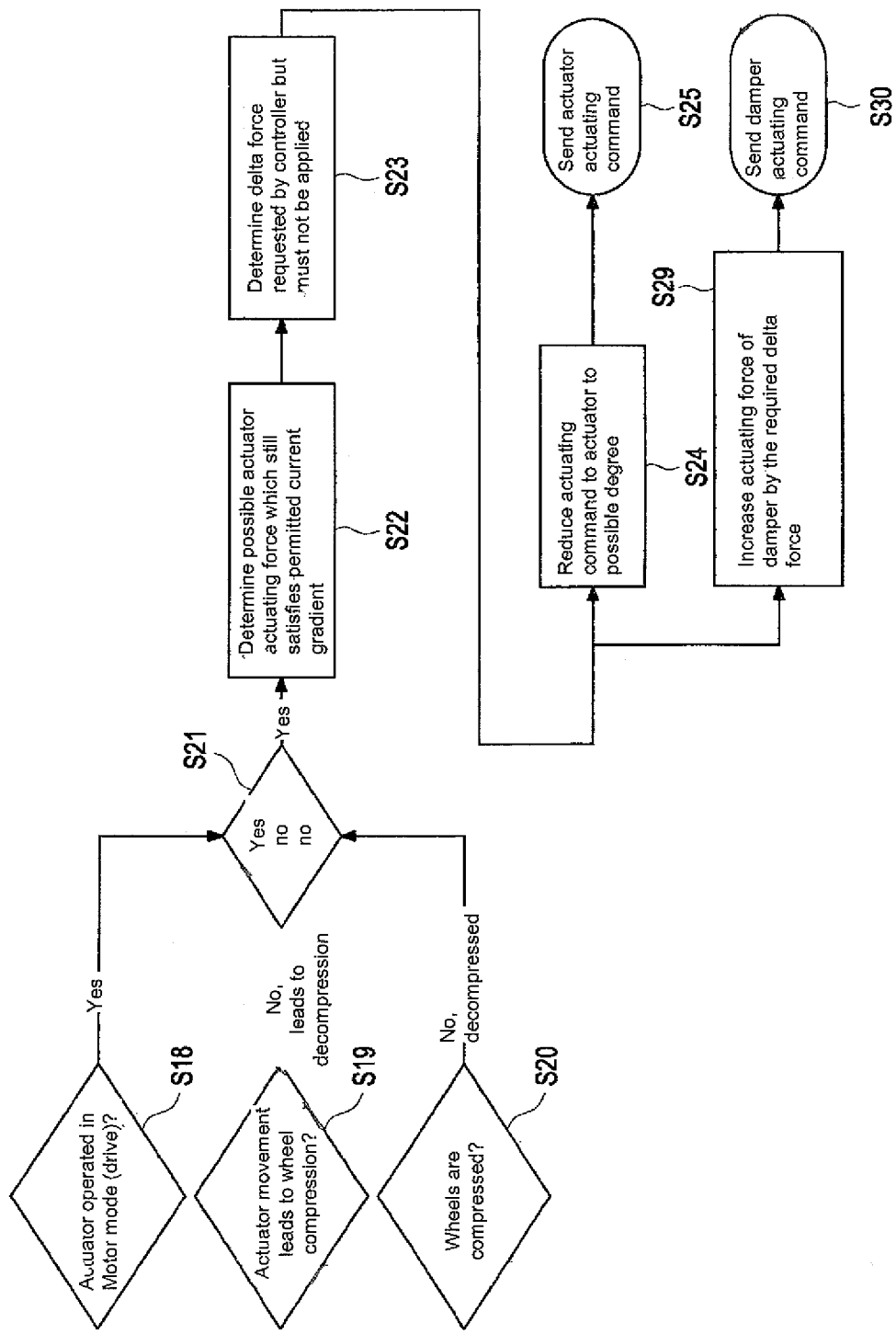
Figure 2:
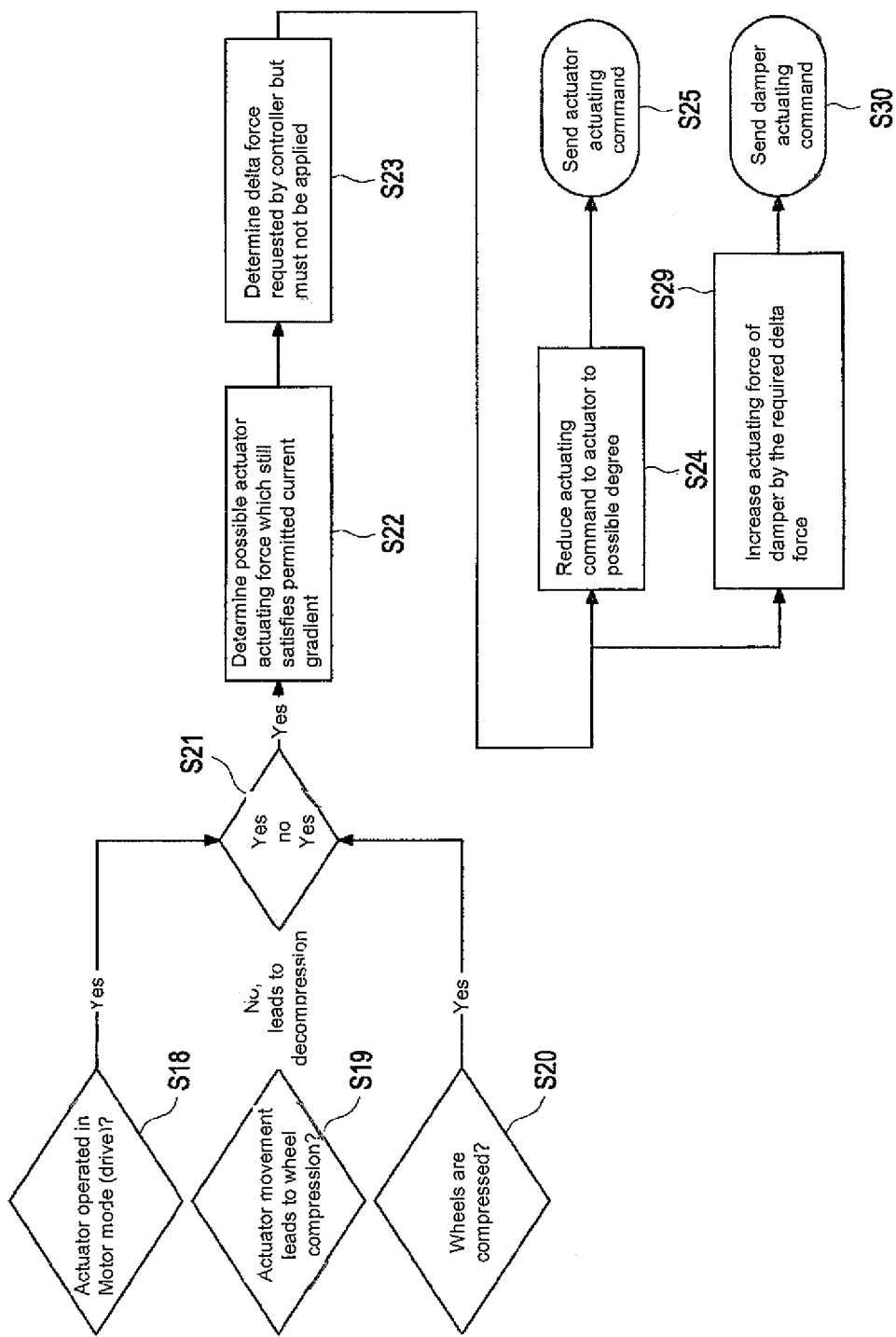
Figure 2:
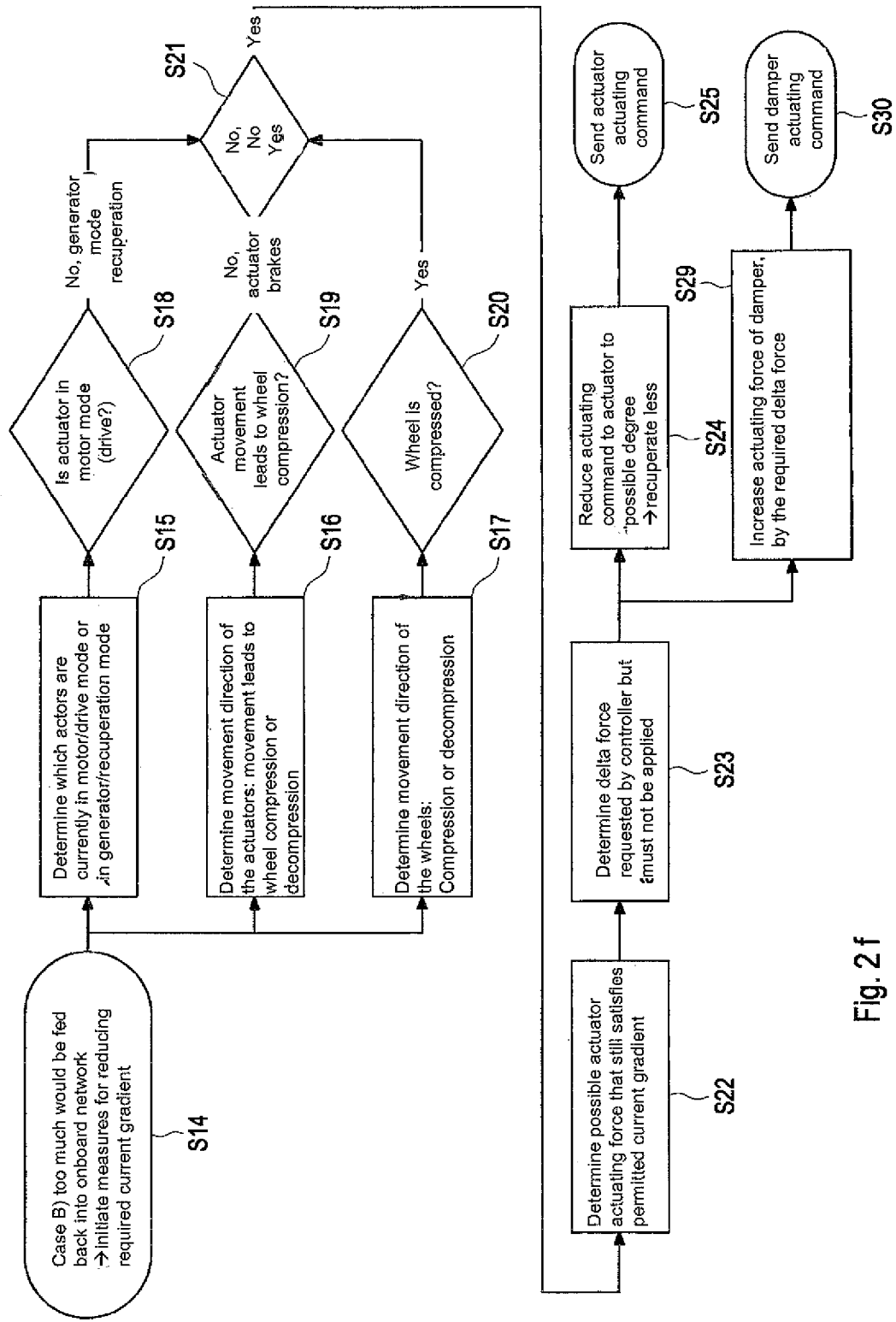
Figure 2:
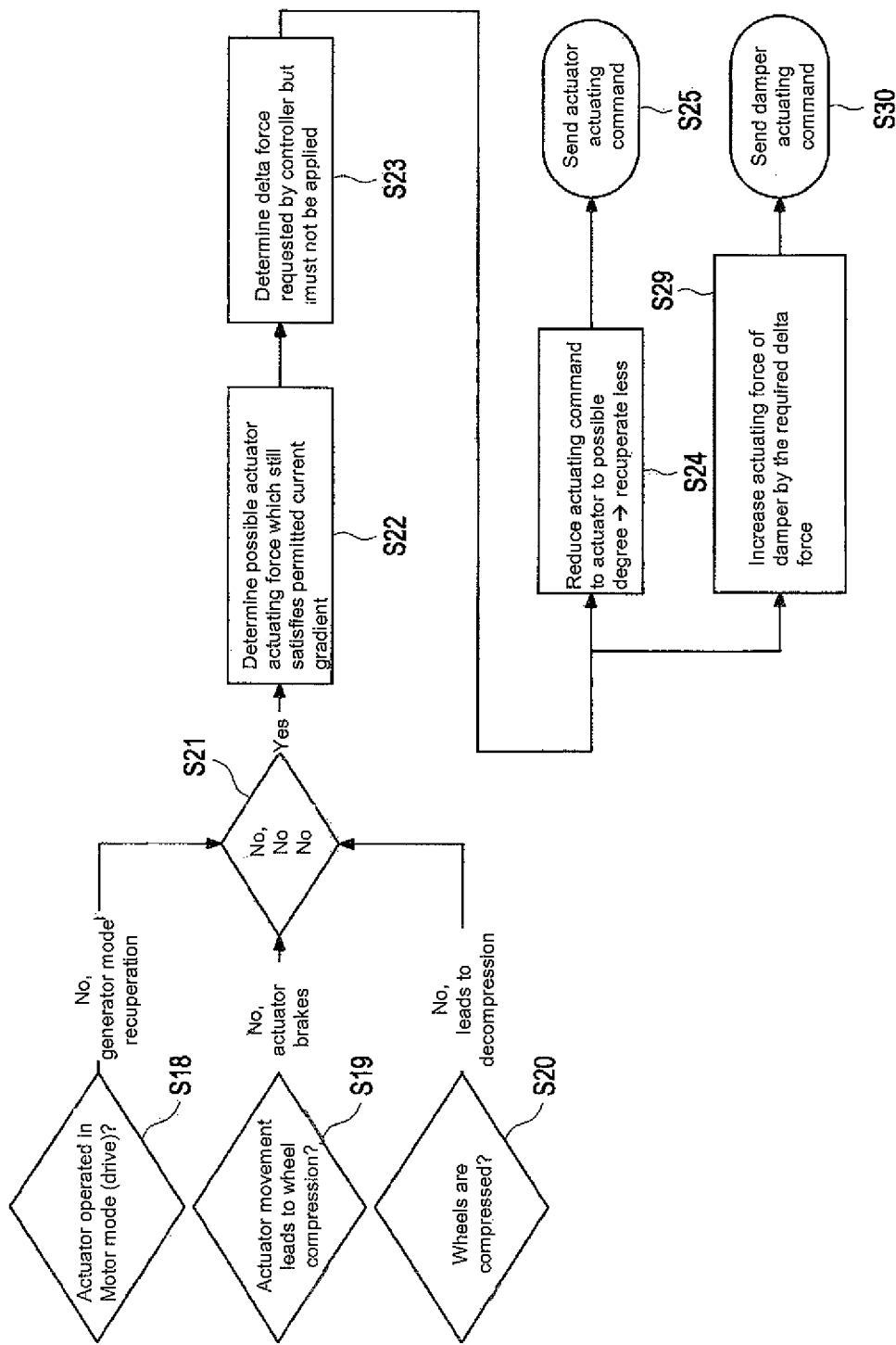
Figure 2:
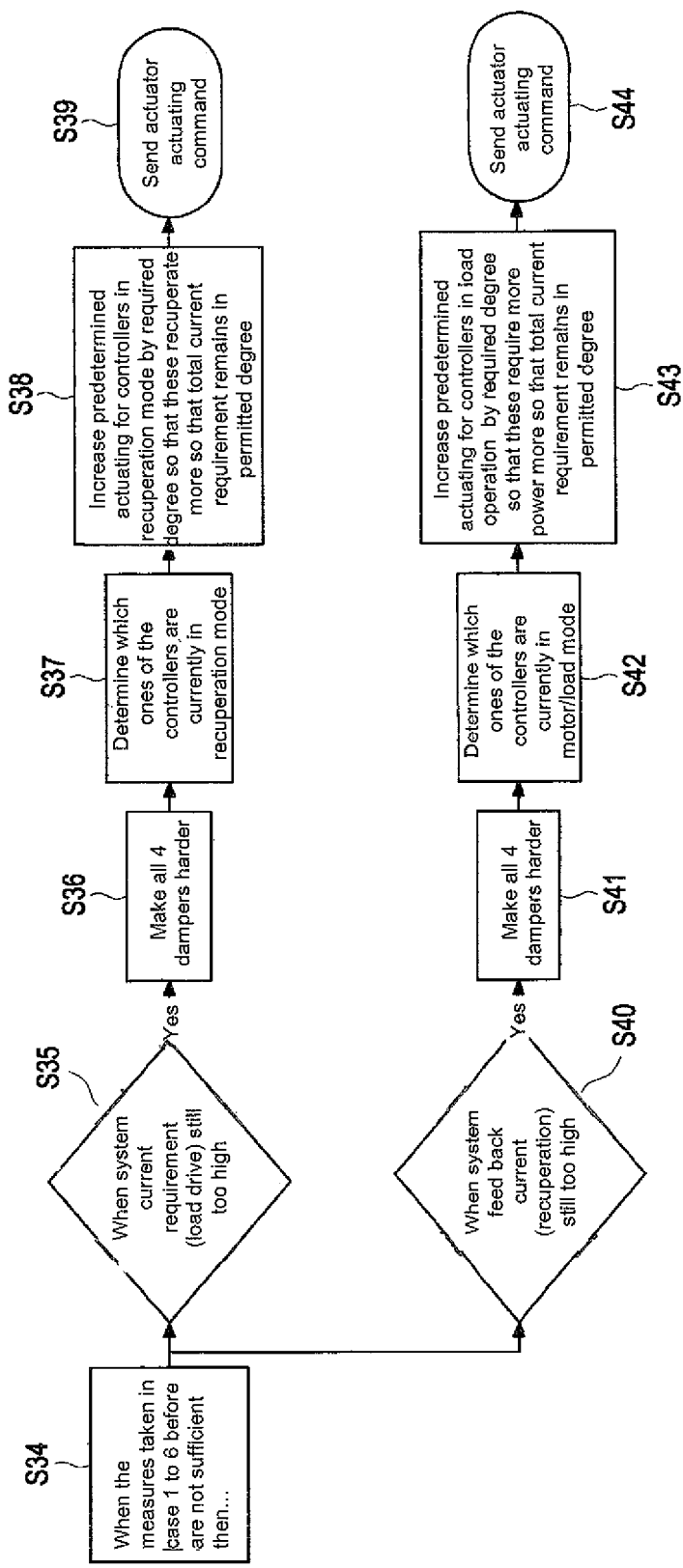

The embodiment of the system 24 according to the invention includes a control device 26, which is configured to control and thus to control an operation of at least one of the described electromechanical controllers 10, 12 by closed loop and/or open loop control, taking an operating state of at least one actuator 6, 8 of the suspension system 13 and/or an operating state of at least one further electromechanical controller 10, 12 and a state of charge of the at least one electrical energy storage 22 into account when performing the embodiment of the method according to the invention described below by way of FIG. 2, wherein the state of charge is defined by a value of the amount of electrical energy in the energy storage 22. In addition the control device 26 can be configured to control the at least one electromechanical controller 10, 12 by taking an operating state of at least one user 16, 18, 20 into account. It is also possible that an operating state of at least one user 16, 18, 20 is controlled by the control device 26 by taking into account an operating state of at least one actuator 6, 8 of the active suspension system 13, an operating state of at least one further electromechanical controller 10, 12, a state of charge of the at least one electrical energy storage 22 and/or an operating state of at least one further user 16, 18, 20.

The variants of the embedment of the method according to the invention illustrated by the partial diagrams in FIGS. 2a, 2b, 2c, 2d, 2e, 2f, 2g and 2h can be performed by the embodiment of the system 24 illustrated in FIG. 1. In the partial diagram of FIG. 2a steps of the embodiment of the method are described on which all variants of the embodiment of the method are based that are described below.

Hereby in a first step S1 a state of charge, and thus the value of the amount of electrical energy, is determined that is stored in the at least one electrical energy storage 22, which is configured as a battery or capacitor. Thereafter in a step S2 a default for a range or values for a voltage for operating the suspension system 13 is determined. At the same time in a step S3 a requirement for setting the suspension system 13 for future setting steps and thus a requirement of electrical energy in the case of a future driving maneuver is estimated. Based thereon in a step S4 a requirement of current and/or electrical energy of the controllers 10, 12 at an available voltage of the onboard network 14 is determined. Proceeding from step S4 in a step S5 the total requirement of current and/or electrical energy of the suspension system 13 at the available voltage of the onboard network 14 is determined. Based thereon in a step S6 the condition is tested whether a requirement of the suspension system 13 of current is positive, so that the suspension system 13 requires electrical energy, from the energy storage 22 of the onboard network 14, which in this case has a voltage of 48 V, with the amount of the electrical energy being a positive.

In addition in step S7 a present value or actual value of a requirement or actual requirement of current and/or electrical energy of the suspension system is measured. In a step S8 a present value or actual value for a current gradient and with this for a change of the current over time is determined from a newly prognosticated value of the current and/or the amount of electrical energy that the suspension system 13 requires, and an old actual value by taking the time, i.e., a time point at which the old actual value was measured in step 7 and a time point at which the value was prognosticated in step S5 into account. In a step S9 a value for a maximal current gradient and with this for a maximal change of the current over time is dynamically set independent on whether electrical energy whose amount has the positive value is withdrawn from the energy storage 22 or whether electrical energy whose amount has the negative value and in a recuperation is fed back into the energy storage 22. In a step S10 the actual value for the current gradient determined in step S8 is compared with the predetermined value in step S9, wherein in an embodiment the amount of the actual value is compared with the amount of the predetermined value and hereby the condition is tested whether the actual value of the current gradient is lower than the predetermined value.

In addition based on whether the condition to be tested in step S6 and whether the condition to be tested in step S10 is satisfied it is decided which of the steps S11, S12, S13, S14 is subsequently performed:

When a requirement of current and/or an amount of required energy (step S6) is negative so that a recuperation of electrical energy in the energy storage 22 is provided and when the actual value of the current gradient (step S10) is lower than the set value, a setting command is provided in step S11 as measure for the at least one controller 10, 12 whereby the at least one actuator 10, 12 is operated as generator and electrical energy is fed into the electrical energy storage by the at least one controller 10, 12.

When according to step S6 the requirement of current and/or an amount of required energy is positive, which calls for a discharge of the energy storage 22, and when the value of the current gradient is lower than permitted therefore by the set value according to step S10, which also calls for discharging the energy storage 22, then in step S12 a setting command is provided for the at least one controller 10, 12, whereby the at least one controller 10, 12 is operated as a motor and electrical energy is withdrawn from the energy storage 22 by the at least one controller 10, 12.

When according to step S6 the requirement of current and/or an amount of required energy is positive which would call for discharging the energy storage 22, and when the value of the current gradient is lower than the set value permitted therefore according to step S10, which would also call discharging the energy storage 22, a setting command is provided in step S12 as a measure for at least one controller 10, 12 whereby the at least one controller 10, 12 is operated as a motor and electrical energy is withdrawn by the at least one controller 10, 12 from the energy storage 22.

When according to step S6 the requirement of current and/or an amount of required electrical energy is positive and the value of the current gradient is higher that the predetermined value permitted according to step S10, then according to step S13 it follows that under the predetermined conditions too much energy would be withdrawn from the energy storage 22, whereupon case A results in step S13 and measures are taken which provide for initiating a reduction of the required current gradient. Further steps or measures that follow the case A or step S13 are described by way of the partial diagrams in the FIGS. 2*b*, 2*c*, 2*d* and 2*e*.

When a requirement of current and/or an amount of required electrical energy (step S6) is negative so that a recuperation of electrical energy is provided in the energy storage 22, and when the actual value of the current gradient (step S10) is higher than the set value then in step S14 case B results according to which too much energy would be fed back into the energy storage 22, which is why when case B occurs measures for reducing the required current gradient are initiated. Further steps or measures, which follow case B or step S14 are described by way of the atrial diagrams in FIGS. 2*f* and 2*g*.

As shown by the partial diagram of FIG. 2*b* and also by the partial diagram of FIG. 2*f*, when case A occurs or step S13 (FIG. 2*b*) but also when case B occurs or step S14 (FIG. 2*f*) states of the actuators 6, 8 are determined in the respective following steps S15, S16 and S17. Hereby each of the steps S15, S16, S17 is followed by a respective step S18, S19, S20 resulting therefrom in which a condition is tested.

Hereby it is determined in step S15, which controller 10, 12 is currently operated as a motor and which one is operated as a generator. Hereby an actuator 6, 8 which is assigned to an controller 10, 12 that is operated as a motor is driven motorically. On the other hand when an actuator 6, 8 drives an controller 10, 12 that is assigned to it, this controller 10, 12 is operated as a generator by which electrical energy is stored in the energy storage 22 in a recuperation mode. In the following step S18 the condition is tested whether the actuator 6, 8 is in the motor operating mode and is hereby driven by the controller 10, 12 that is assigned to it and can be operated as a motor.

In step S16 a direction of movement of the actuator 6, 8 is determined, from which it is turn determined whether the movement of the actuator 6, 8 leads to a compression in or decompression of the wheel 4. Subsequent thereto in step S19 the condition is tested whether the movement of the actuator 6, 8 leads to a compression of the wheel 4.

In step S17 a direction of movement of a wheel 4, which directly interacts with an actuator 6, 8 that is directly assigned to the wheel 4 and interacts indirectly with an controller 10, 12 that is indirectly assigned to the wheel 4 is determined, whereupon in step S20 the condition is tested whether the wheel 4 is compressed.

In the first variant of the method illustrated by the partial diagram in FIG. 2*a*, step S21 indicates that all conditions tested in steps S18, S19 and S20 are satisfied (yes). Accordingly the actuator 6, 8 is motorically driven in the motor mode by the controller 10, 12 assigned to the actuator 6, 8 (step S18), wherein a movement of the actuator 6, 8 leads to a compression of the wheel 4 (step S19) and the wheel 4 is compressed (step S20). When this is the case the method proceeds from step 21 to step S22 in which a possible actuator actuating force is determined that the controller 10, 12 exerts on the actuator 6, 8 assigned to the controller and that satisfies the set value for the current gradient. Thereafter in step S23 a value for a possible delta force or differential force is determined which is additionally desired or requested by the controller 10, 12 to exert this delta force in addition to an actually exerted force on the actuator 6, 8 that is assigned to the wheel 4, wherein this additional delta force however is impermissible and must not be applied. Subsequently in step S24 a setting command to the controller 10, 12 and the actuator 6, 8 assigned thereto is limited to a possible permissible degree, wherein this setting command is transmitted in step S25 to the controller 10, 12 that is assigned to the actuator 6, 8. In addition in step S26 an actuating force that a controller 10, 12 exerts on an actuator 6, 8 that is configured as a damper is reduced by a force, maximally by a delta force. When this is not possible the actuator 6, 8 that is configured as a damper is set to a soft setting. In step S27 a setting command is sent due to a measure taken in step S26, with which setting command the controller 10, 12, which is assigned to the actuator 6, 8 which is constructed as a damper, can be impinged.

In the second variant of the method, which is described by way of the partial diagram in FIG. 2c, it is determined in step S21 that only the conditions tested in steps S18, S19 are satisfied (yes), whereas the condition S20 tested in step S20 is not satisfied (no). Thus the actuator 6, 8 is driven by the controller 10, 12 assigned to the actuator 6, 8 in the motor operation (step S18), wherein a movement of the actuator 6, 8 leads to a compression of the wheel 4 (step S19). However the wheel 4 in this case is not compressed in (step S20, no). Thereupon the steps S22 and S23 and S24 and S25 are performed as in the first variant. However, depending on the variant, in a step S29 an actuating force that a controller 10, 12 exerts on an actuator 6, 8 that is configured as a damper is increased by the delta force determined beforehand in step S23, and in step S30 a setting command is transmitted with which the controller 10, 12, which is assigned to the actuator 6, 8 which is configured as damper can be impinged.

The partial diagram of FIG. 2d shows that in the third variant of the embodiment of the method the actuator 6, 8 is driven in the motor operating mode by the controller 10, 12 assigned to the actuator 6, 8 and thus the condition tested in step S18 is satisfied (yes). However, the conditions tested in steps S19 and S20 are not satisfied (no) and therefore in this case a movement of the actuator 6, 8 leads to a decompression of the wheel 4 (step S19) and the wheel 4 is decompressed (step S20). The steps S22, S23, S24 and S25 are performed as in the first variant. The simultaneously performable steps are performed as in the second variant which is described by the partial diagram of FIG. 2c.

The fourth variant of the embodiment of the method, illustrated by way of the partial diagram of FIG. 2e, differs from the variants illustrated by the partial diagrams of FIGS. 2b, 2c and 2d in that in step S21 it is now determined that the actuator 6, 8 is motorically driven in the motor operating mode by the controller 10, 12 assigned to the actuator 6, 8 (step S18, yes), that a movement of the actuator 6, 8 leads to a decompression of the wheel 4 (step S19, no) and that the wheel 4 is in this case compressed (step S20). Based thereon, however, also in the fourth variant of the embodiment of the method a setting command, which is limited to a possible permissible degree, is sent in step S25 to the controllers 6, 8 that are assigned to the actuator 10, 12, and in step S30 a further setting command is sent to the controller 10, 12 with which the controller 6, 8 which is assigned to the actuator 10, 12 that is configured as a damper, can be impinged.

In the further variants of the embodiment of the method, which are described by way of the diagrams of FIGS. 2f and 2g, case B (step S14) presented in FIG. 2a is assumed.

In the fifth variant which is illustrated with the partial diagram of FIG. 2f it is determined in a step S21 that the actuator 6, 8 is not operated in the motor operating mode but in the generator operating mode. Thus the controller 10, 12 that is assigned to the actuator 6, 8 is operated as a generator, wherein the controller 10, 12 is moved by the actuator 6, 8 and thus driven (step S18, no). In addition a movement of the wheel 4 is decelerated by the actuator 6, 8 instead of the wheel being compressed (step S19, no). However, the wheel is nevertheless compressed (step S20, yes). Subsequent thereto the same steps S22 to S30 are performed as in the variants that are described with the partial diagrams of FIGS. 2c to 2e, wherein regarding step S24 the actuator 10, 12 now can convert and this recuperate less mechanical energy into electrical energy.

As an alternative thereto in the sixth variant of the embodiment of the method, which is illustrated with the partial diagram of FIG. 2g, it is determined in step S21 that the actuator 6, 8 is operated in the generator operating mode and the controller 10, 12 which is assigned to the actuator 6, 8 is driven by the actuator 6, 8 as generator (step S18, no). In addition a movement of the wheel 4 is decelerated by the actuator 6, 8 (step S19, no) and the wheel is undergoes decompression (step S20, no). Subsequently the same steps S22 to S30 as in the fifth variant (FIG. 2f) are performed.

A seventh variant of the embodiment of the method is performed as shown in the partial diagram of FIG. 2h, when in an additional step S34 it is determined that none of the variants of FIGS. 2a to 2g described above is sufficient.

When starting from step S34 it is determined that a requirement of the suspension system 13 is still too high when at least one of the controllers 10, 12 is operated as a motor (step S35), all actuators 8 that are configured as dampers are hardened in step S36. Subsequent thereto it is determined in step S37 which one of the at least one controller 10, 12 is now operated as a generator in the recuperation mode. Thereafter a predetermined value or predetermined set value for the at least one controller 10, 12 that is operated in the recuperation mode or is driven as generator is increased by a degree by which the recuperation and with this the conversion of mechanical energy into electrical energy by the at least one actuator 10, 12 is increased so that the requirement of current by the suspension system 13 is below a value provided therefore. Based on the predetermined set value a setting command is sent in step S39 to the controller 10 12 that is assigned to the actuator 6, 8.

On the other hand when starting from step S34 it is determined in step S40 that an amount of mechanical energy which is converted into electrical energy and is fed back into the energy storage 22 when the at least one actuator 10, 12 is operated as a generator is still too high all actuators 8 that are configured as a damper are hardened in step S41. Subsequent thereto it is determined in step S42 which one of the at least one controller 10, 12 is currently operated in the load mod as motor. Thereafter a predetermined value or predetermined set value for the at least one controller 10, 12 that is operated in the load operation or as a motor is increased for increasing the mechanical power of the controller 10, 12 so that the amount of current required by the suspension system 13 lies above a value that is provided therefore. Based in the predetermined value a setting command is sent in step S44 to the controller 10, 12 that is assigned to the actuator 6, 8.

The invention claimed is:
1. A method for controlling an active suspension system of a motor vehicle said method comprising:

providing an active suspension system having actuators and electromechanical controllers, said actuators including at least one spring and at least one damper, wherein a respective one of the electromechanical controllers is assigned to each one of the actuators and cooperates with the one of the actuators, each of the electromechanical controllers being connected with at least one electrical energy storage of the motor vehicle via an onboard network of the motor vehicle;

during a driving maneuver of the motor vehicle operating at least one of the electromechanical controllers either as a generator or as a motor, wherein when the least one electromechanical controller is operated as a generator the at least one electromechanical controller during the driving maneuver generates electrical energy, whose amount has a negative value, wherein when the at least one electromechanical controller is operated as a motor the least one electromechanical controller during the driving maneuver consumes electrical energy, whose amount has a positive value;

subtracting a value for an amount of electrical energy converted by the suspension system in an actually performed driving maneuver from an actual value of electrical energy stored in the electrical energy storage, thereby forming a differential value;

comparing the differential value with at least one threshold value;

when the differential value is greater than a maximal threshold value and at least a first one of the electromechanical controllers is operated as a generator, operating at least one second one of the electromechanical controllers as a motor, wherein at least a portion of electrical energy which is generated by the at least one first electromechanical controller is simultaneously converted by the at least one second electromechanical controller into mechanical energy.

2. The method of claim 1, further comprising operating at least one further electromechanical machine which is connected with the electrical energy storage as a motor.

3. The method of claim 1, further comprising when the differential value is smaller than a minimal threshold value and at least one first one of the electromechanical controller is operated as a motor, operating at least one second one of the electromechanical controller as a generator, wherein at least a portion of the electrical energy which is consumed by the at least one first electromechanical controller is simultaneously generated by the at least one second electromechanical controller.

4. The method of claim 3, further comprising operating at least one further electromechanical machine as a generator, said at least one further electromechanical machine being connected with the at least one electrical energy storage.

5. The method of claim 1, further comprising
operating each electromechanical controller in a first operating mode as a generator or in a second operating mode as a motor, wherein each of the electromechanical controllers that is operated as a generator in the first operating mode is mechanically impinged by the actuator assigned to the respective electromechanical controller;
converting with the electromechanical controller that is operated as a generator mechanical energy into electrical energy, and storing the electrical energy in the at least one electrical energy storage;
converting with the electromechanical controller that is operated as a motor in the second operating mode electrical energy from the at least one electrical energy storage into mechanical energy, thereby mechanically impinging the actuator that is assigned to the electromechanical controller.

6. The method of claim 1, further comprising operating at least a first one of the electromechanical controllers which is assigned to at least one first actuator as a generator and simultaneously operating at least a second one of the electromechanical controller as a motor, wherein said first and second electromechanical controllers are respectively assigned to at least one first and one second one of the actuators, said at least one first and at least one second actuator being actuators of a same wheel.

7. The method of claim 1, further comprising operating at least one first one of the electromechanical controllers which is assigned to at least one of the actuators that is configured as a spring as a generator, and simultaneously operating at least one further one of the electromechanical controllers, which is assigned to at least one of the actuators that is configured as a damper, as a motor.

8. The method of claim 6, further comprising comparing a value of a current which is required during the driving maneuver by the suspension system for converting electrical energy with a threshold value, wherein when the value of the current is smaller than the threshold value and the least one first one of the electromechanical controllers is operated as a generator, operating the at least one second one of the electromechanical controllers as a motor, wherein at least a portion of the electrical energy which is generated by the at least one first electromechanical controller is simultaneously converted by the at least one second electromechanical controller into mechanical energy.

9. A system for controlling an active suspension system of a motor vehicle, said active suspension system having actuators and controllers, said actuators including at least one spring and at least one damper, wherein each of the actuators is assigned a respective one of the electromechanical controllers which respectively cooperates with the actuator, wherein each of said electromechanical controllers is connected with an electrical energy storage of the motor vehicle via an onboard network of the motor vehicle, wherein at least one of the electromechanical controllers is operable as a generator or as a motor, wherein when the at least one electromechanical controller is operated as a generator electrical energy, whose amount has a negative value, is generated by the at east one electromechanical controller during a driving maneuver, wherein when the at least one electromechanical controller is operated as a motor electrical energy, whose amount has a positive value, is consumed by the at least one electromechanical controller, said system comprising:
a control device, which is configured
to subtract a value for an amount of electrical energy converted by the suspension system during an actually performed driving maneuver from an actual value for an amount of electrical energy stored in the at least one electrical energy storage, thereby forming a differential value, and
to compare the differential with at least one threshold value, and when the differential value is greater than a maximal threshold value and at least one first electromechanical controller is operated as a generator to operate at least one second electromechanical controller as a motor, wherein at least a portion of the electrical energy which can be generated by the at least one electromechanical controller is simultaneously converted by a second electromechanical controller into mechanical energy.

10. The system of claim 9, wherein the control device is further configured, when the differential value is smaller than a minimal threshold value and at least one first electromechanical controller is operated as a motor, to operate at least one second electromechanical controller as a generator, wherein at least a portion of the electrical energy which is consumed by the at least one first electromechanical controller is simultaneously generated by the at least one second electromechanical controller.

* * * * *